US010010460B2

(12) United States Patent
Sirkin et al.

(10) Patent No.: US 10,010,460 B2
(45) Date of Patent: Jul. 3, 2018

(54) SURGICAL RAIL APPARATUS FOR LITTER (71) Applicant: The United States of America as represented by the Secretary of the Army, Washington, DC (US)

(72) Inventors: Maxwell Sirkin, El Paso, TX (US); Jason Hiles, El Paso, TX (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/543,019

(22) PCT Filed: May 28, 2016

(86) PCT No.: PCT/US2016/034897
§ 371 (c)(1),
(2) Date: Jul. 12, 2017

(87) PCT Pub. No.: WO2016/196394
PCT Pub. Date: Dec. 8, 2016

(65) Prior Publication Data
US 2018/0000666 A1  Jan. 4, 2018

Related U.S. Application Data (60) Provisional application No. 62/168,953, filed on Jun. 1, 2015.

(51) Int. Cl.
*A61G 1/052* (2006.01)
*A61G 13/10* (2006.01)
(Continued)

(52) U.S. Cl.
CPC ............ *A61G 1/052* (2013.01); *A61G 13/105* (2013.01); *F16M 13/02* (2013.01); *A61G 1/048* (2013.01);
(Continued)

(58) Field of Classification Search
CPC . A61G 1/00; A61G 1/04; A61G 1/048; A61G 1/052; A61G 1/06; A61G 7/0503;
(Continued)

(56) References Cited

U.S. PATENT DOCUMENTS 3,000,018 A    9/1961  Collins
4,506,872 A    3/1985  Westerberg et al.
(Continued)

FOREIGN PATENT DOCUMENTS

EP       0296872      12/1988

*Primary Examiner* — Nicholas F Polito
(74) *Attorney, Agent, or Firm* — Elizabeth Arwine; William Eshelman (57) ABSTRACT

An apparatus (18) for mounting surgical rails (40, 42) to a litter (10) having a pair of parallel poles (12) includes a pair of longitudinal members (20, 22) fixed to outboard sides of respective ones of the pair of poles (12). A pair of surgical rails (40, 42) is fixed to outboard surfaces of respective ones of the pair of longitudinal members (20, 22). Clamps (24, 26, 28, 30) at each end of each longitudinal member (20, 22) fix the longitudinal members (20, 22) to the pair of poles (12). A pair of cross bars (36, 38) extend between and are fixed to opposing clamps (24, 26, 28, 30) at each end of each longitudinal member (20, 22).

2 Claims, 6 Drawing Sheets (51) Int. Cl.
*F16M 13/02* (2006.01)
*A61G 1/048* (2006.01)

(52) U.S. Cl.
CPC ........ *A61G 13/101* (2013.01); *A61G 2203/78* (2013.01)

(58) Field of Classification Search
CPC ...... A61G 13/00; A61G 13/10; A61G 13/101; A61G 13/104; A61G 13/105
See application file for complete search history.

(56) References Cited

U.S. PATENT DOCUMENTS

| | | |
|---|---|---|
| 4,852,841 A | 8/1989 | Sebring |
| 5,373,276 A | 12/1994 | Nelson et al. |
| 5,590,431 A | 1/1997 | O'Connell |
| 5,845,351 A | 12/1998 | Berta et al. |
| 6,023,800 A | 2/2000 | Stickley |
| 6,273,089 B1 | 8/2001 | Shultz et al. |
| 6,546,577 B1 | 4/2003 | Chinn |
| 7,458,743 B2 | 12/2008 | Smeed |
| 7,461,857 B2 | 12/2008 | Darling |
| 7,523,514 B2 | 4/2009 | Salt et al. |
| 8,387,963 B2 | 3/2013 | Moutafis |
| 8,443,472 B2 | 5/2013 | Sherman et al. |
| 8,915,478 B2 | 12/2014 | Perez |
| 9,750,657 B2 * | 9/2017 | Drake .................. A61G 13/128 |
| 2012/0241571 A1 | 9/2012 | Masionis et al. |
| 2015/0040319 A1 | 2/2015 | Doak |
| 2018/0104120 A1 * | 4/2018 | Sirkin ...................... A61G 1/04 |
| 2018/0110662 A1 * | 4/2018 | Doak ....................... A61G 1/04 |

* cited by examiner

FIG. 6

SURGICAL RAIL APPARATUS FOR LITTER

CROSS REFERENCE TO RELATED APPLICATIONS

The present application claims the benefit of priority of U.S. provisional patent application Ser. No. 62/168,953 filed on Jun. 1, 2015 which is expressly incorporated by reference herein.

STATEMENT OF GOVERNMENT INTEREST

The invention described herein may be manufactured, used and licensed by or for the United States Government.

BACKGROUND OF THE INVENTION

The invention relates in general to emergency medical care and in particular to apparatus for securely attaching medical/surgical devices to an injured person carrier, such as a litter or stretcher.

Figure 1:
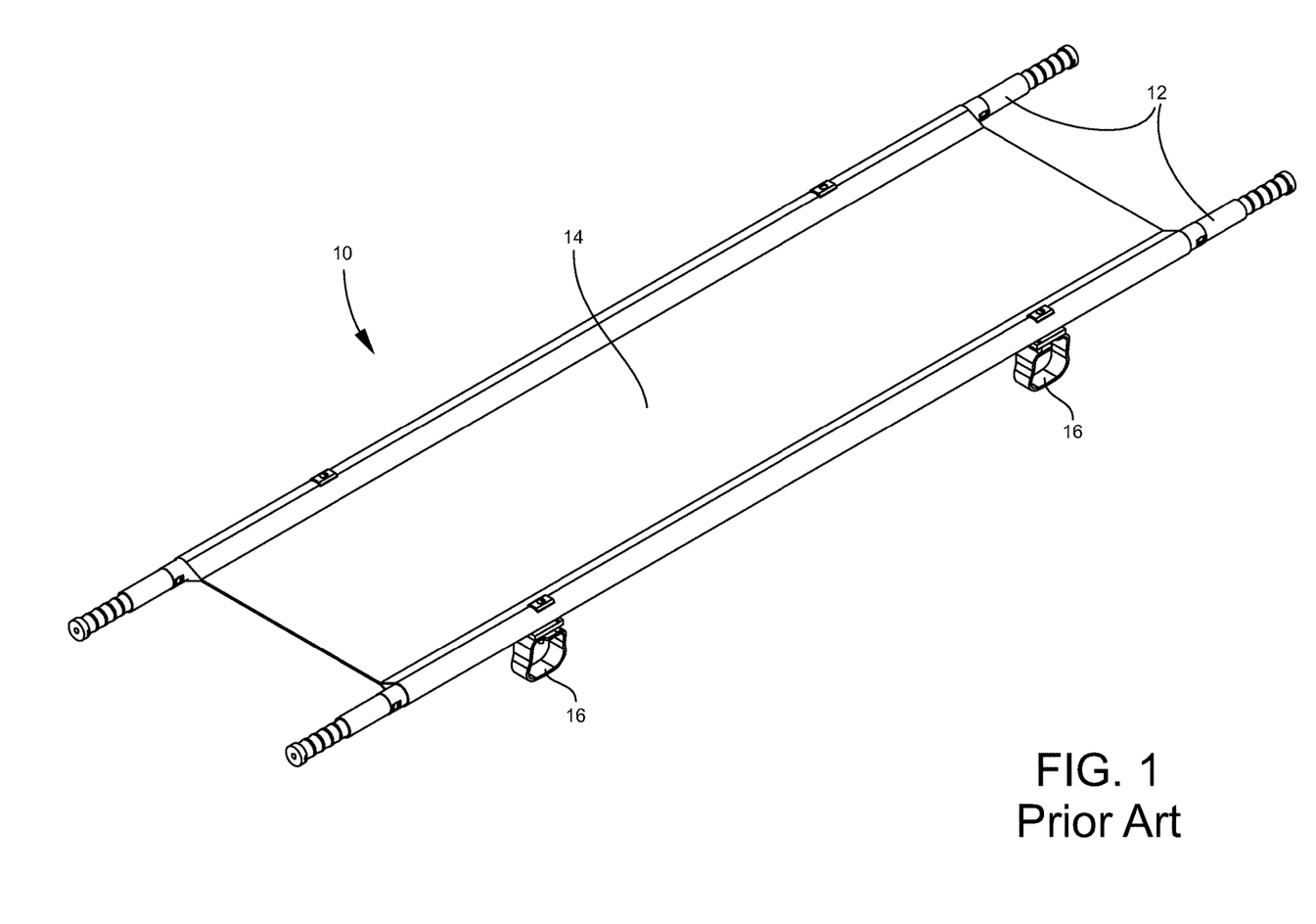
FIG. 1 is a perspective view of a litter.
Figure 3:
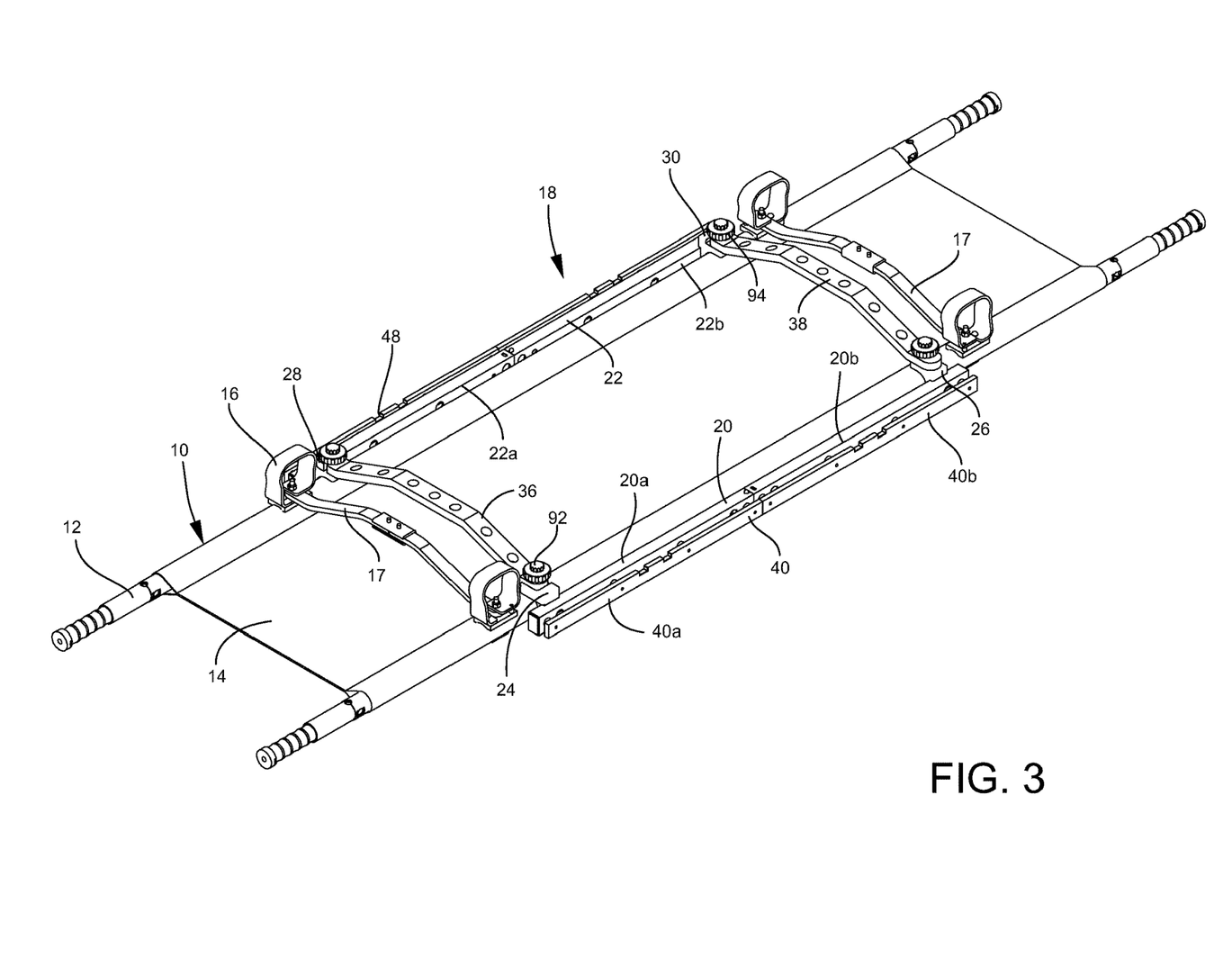
FIG. 3 is a bottom perspective view of FIG. 2.

Every day people are injured, especially during armed conflicts, terrorism, accidents and natural disasters. The injuries may be serious and may require the injured person to be placed on a stretcher, litter or similar injured person carrier. An example of a litter is a NATO litter 10 shown in FIG. 1. The NATO litter 10 includes a pair of parallel poles 12 and a fabric that forms a bed 14 extending between the poles 12. The poles 12 may be made of, for example, wood or a metal such as aluminum. Litter 10 may include stirrups 16 for supporting the litter 10 on the ground or a platform. As seen in FIG. 3, litter 10 may also include cross beams 17 that extend under the bed 14 between opposing stirrups 16.

The injured person may receive medical attention at or near the geographical site of the injury and then be transported via a litter by foot, land vehicle, air vehicle or other transporter to a medical treatment facility. The injured person may require treatment and/or surgery before being transported to a medical treatment facility. Sometimes one or more medical and/or surgical devices are required for treatment and/or surgery for the injured person prior to and/or while being transported to a medical treatment facility. Such medical and/or surgical devices may include, for example, retractors, arm boards, IV poles, suction devices, lights, monitors and other devices.

To keep such medical/surgical devices close to the injured person, the medical/surgical devices may be somehow associated with the injured patient carrier. In combat areas, the transport of an injured person on a litter may be by two people who are walking or running over rough terrain, by a helicopter or other air vehicle that is subject to unpredictable air currents, by a military ambulance over rough terrain, or combinations of such transporters. The resulting ride could therefore be subject to unforeseen air currents or rapid aircraft movements that cause the aircraft to drop suddenly, make rapid and sharp turns and otherwise continue on its journey to transport the injured person(s) to a medical facility as quickly as possible. Such rapid transporter movements require that the medical/surgical devices are secured against reacting to the sudden change of movements and directions by flying off into space and/or within the transport vehicle and possibly further injuring the injured person or injuring persons who are assisting the injured person and/or flying or driving the transporter.

Some stretcher based operating tables, like the English table, do not enable the placement and use of self-retaining fixed retractors like the Bookwalter retractors. This limitation greatly inhibits the scope and ease of surgeries possible on these platforms. The placement of arm boards and leg/foot rests on stretcher based operating tables is possible but it is very limited and cumbersome. The SMEED (Special Medical Emergency Evacuation Device) platform and CMS MOJO™ ready station allow for attachment of multiple devices in multiple locations, but they do not allow for the attachment of a wide variety of surgical devices necessary for better exposure and ease of operation. While the SMEED allows for attachment of valuable monitoring devices necessary in an ICU or transport setting, it cannot accept attachments for surgical retractors and does not facilitate better exposure, positioning or ease of operation. The MOJO™ ready station allows for attachment of some devices like trays and lights, which may help in surgery, but does not allow for attachment of arm boards, retractors, and leg rests.

A need exists for an apparatus for securely fixing a wide variety of medical/surgical devices to a litter for use as an operating table and for transporting the litter along with the medical/surgical devices and the patient.

SUMMARY OF THE INVENTION

One aspect of the invention is an apparatus for use with a litter having a pair of parallel poles. The apparatus may include a first longitudinal member and a second longitudinal member spaced apart from and parallel to the first longitudinal member. The apparatus may include four clamps.

A first clamp has a circular inner surface and an opening for receiving one of the pair of parallel poles. The first clamp is fixed to one end of the first longitudinal member such that the opening faces the second longitudinal member. A second clamp has a circular inner surface and an opening for receiving the one of the pair of parallel poles. The second clamp is fixed to another end of the first longitudinal member such that the opening faces the second longitudinal member. A third clamp has a circular inner surface and an opening for receiving the other of the pair of parallel poles. The third clamp is fixed to one end of the second longitudinal member such that the opening faces the first clamp on the first longitudinal member. A fourth clamp has a circular inner surface and an opening for receiving the other of the pair of parallel poles. The fourth clamp is fixed to another end of the second longitudinal member such that the opening faces the second clamp on the first longitudinal member.

A first cross bar extends between and is fixed to the first and third clamps. A second cross bar extends between and is fixed to the second and fourth clamps. A first rectangular bar is spaced apart from and fixed to an outer surface of the first longitudinal member. A second rectangular bar is spaced apart from and fixed to an outer surface of the second longitudinal member. The first and second rectangular bars are preferably standard surgical rails.

In one embodiment, the first and second longitudinal members are hollow members. The first and second longitudinal members may each comprise a sub-member with a female end and a sub-member with a male end. The male end is inserted in the female end.

The male end may include a spring-loaded latch and the female end may include an opening in which the spring-loaded latch is disposed to thereby lock the sub-members together.

Each clamp may include a set screw for fixing the clamp to a respective one of the parallel poles. Each clamp may include a lock nut having a protuberance disposed in an opening in one of the first and second cross bars for securing the one of the first and second cross bars to the clamp. The set screw may engage a threaded opening in the lock nut.

The first longitudinal member of the apparatus may be disposed outboard of the one of the parallel poles of the litter and the second longitudinal member may be disposed outboard of the other of the parallel poles of the litter. The first and second clamps may be fixed to one of the parallel poles and the second and third clamps may be fixed to the other of the parallel poles. The first and second cross bars may extend under a bed of the litter.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

Figure 2:
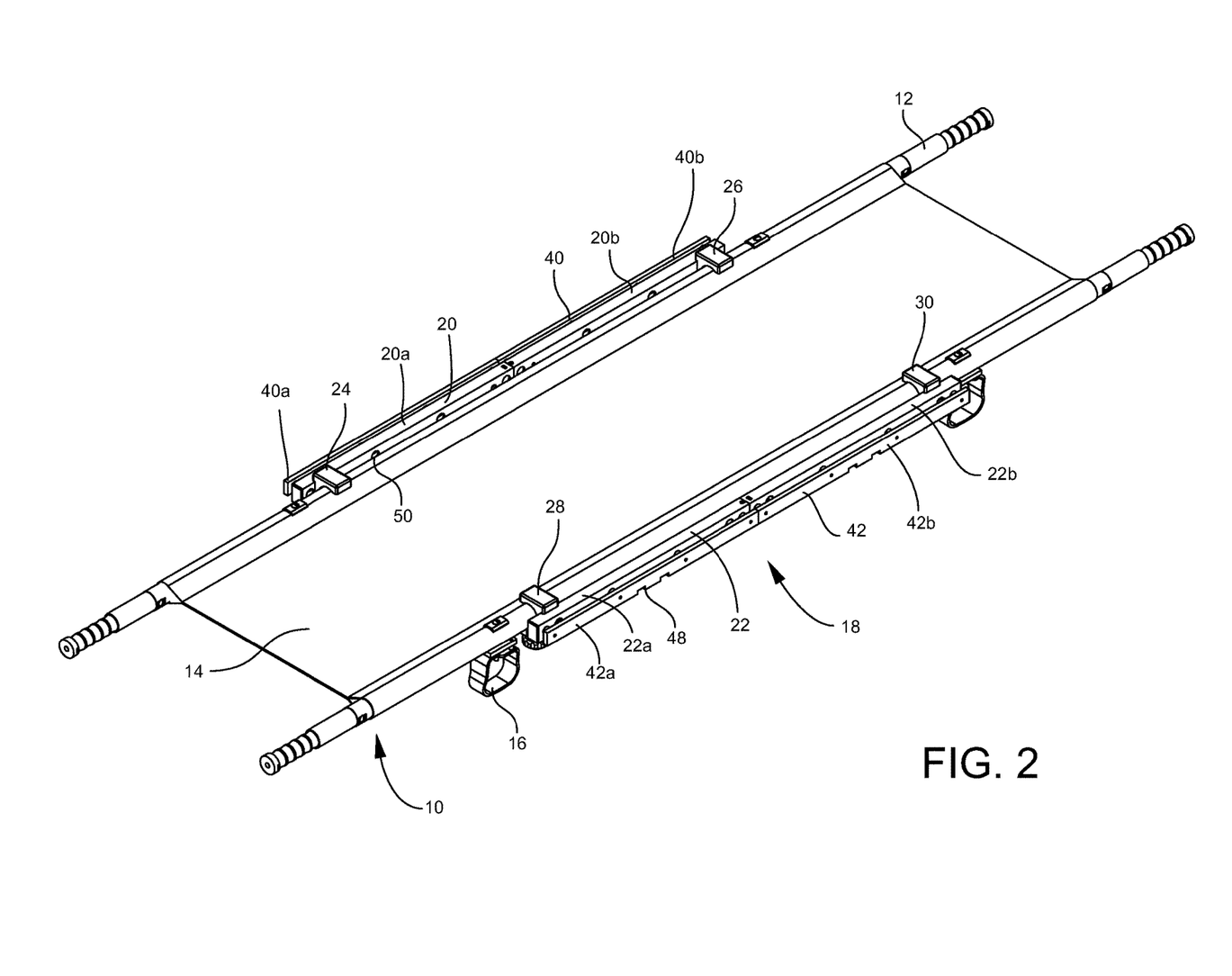
FIG. 2 is a perspective view of the litter of FIG. 1 with one embodiment of a surgical rail apparatus installed thereon.

FIGS. 2 and 3 show one embodiment of a surgical rail apparatus 18 installed on a litter 10. Apparatus 18 is of use when installed on litter 10 of other patient carrier. For clarity, FIGS. 4-6 show the apparatus 18 without the litter 10.

Figure 4:
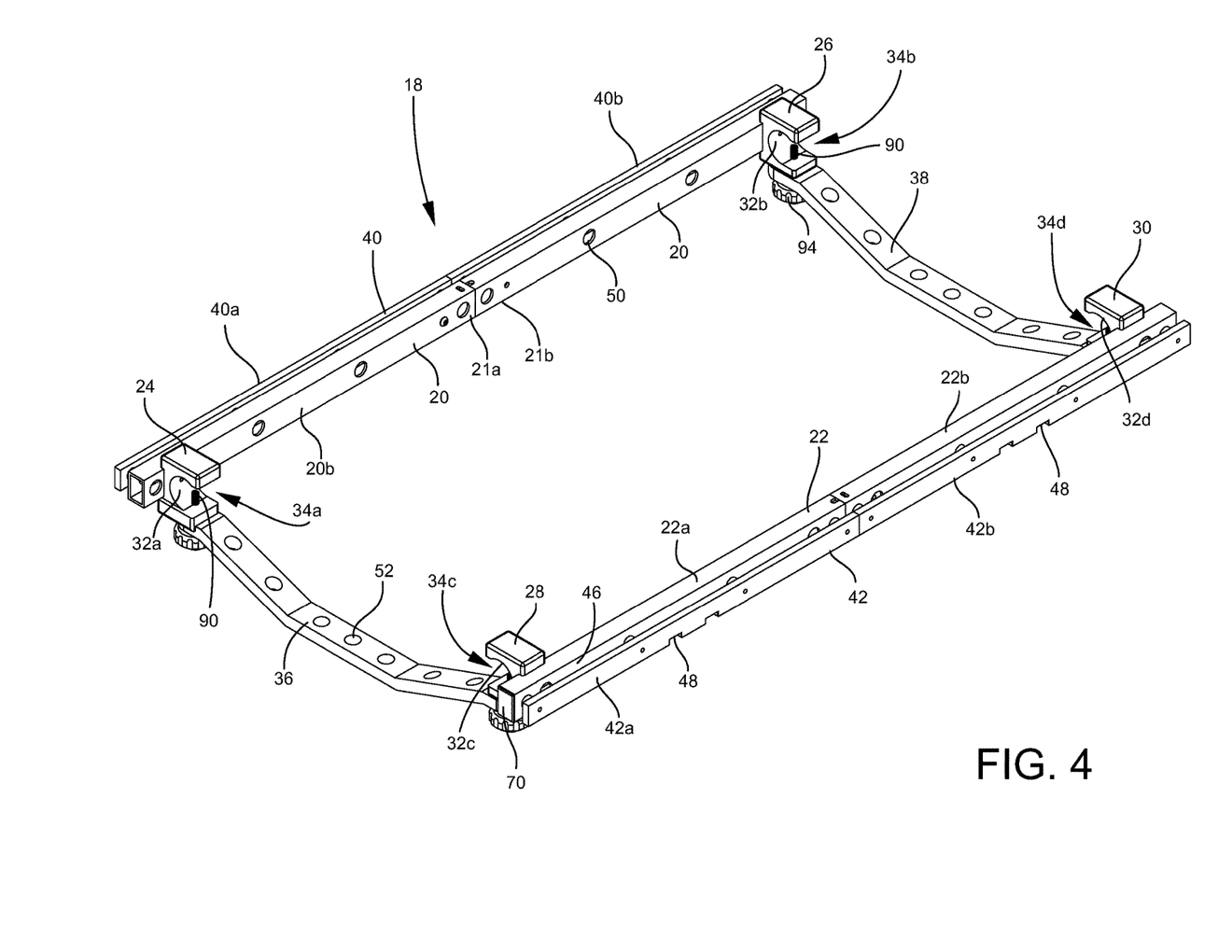
FIG. 4 is a top perspective view of one embodiment of a surgical rail apparatus without the litter.
Figure 5:
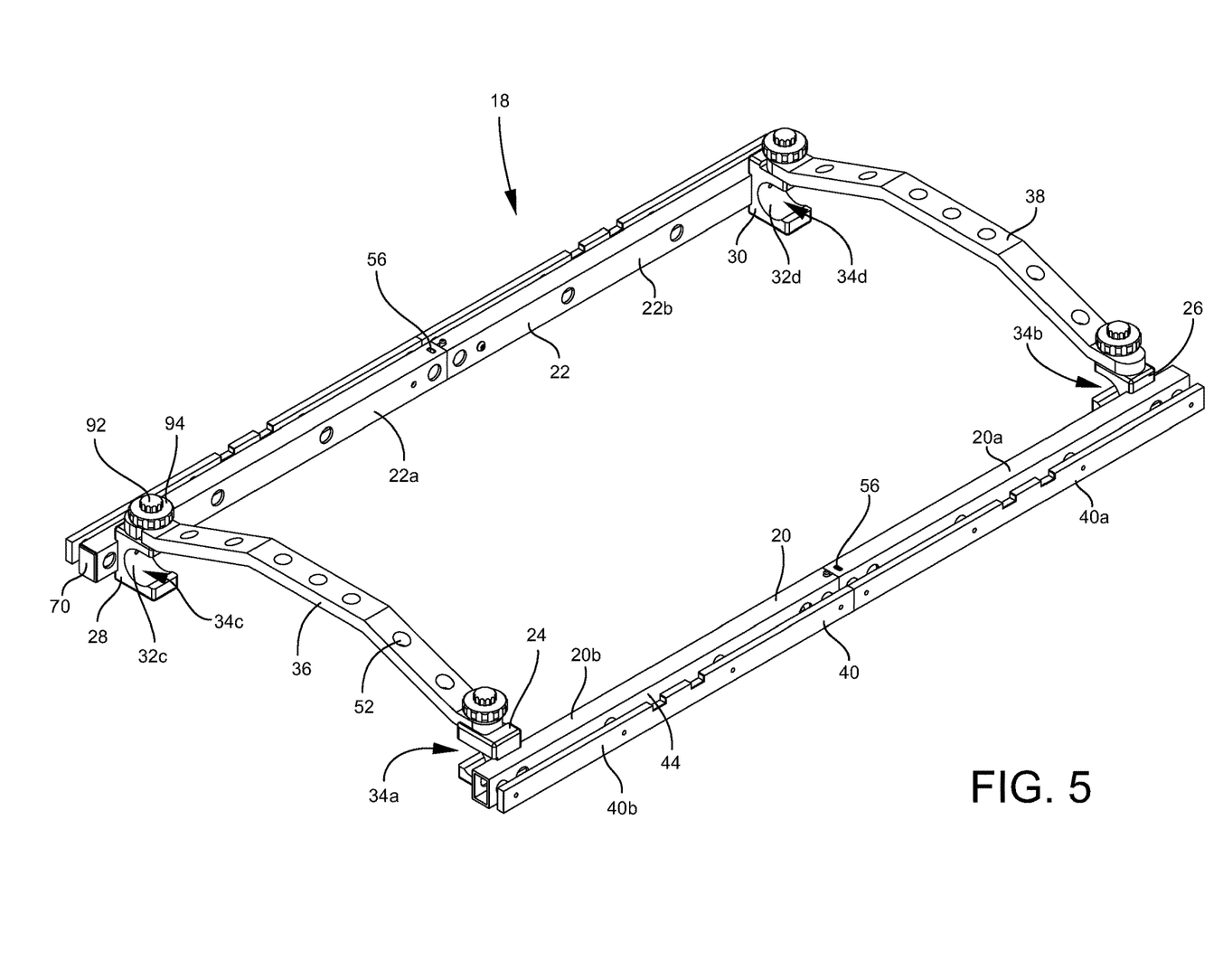
FIG. 5 is a bottom perspective view of FIG. 4.
Figure 6:
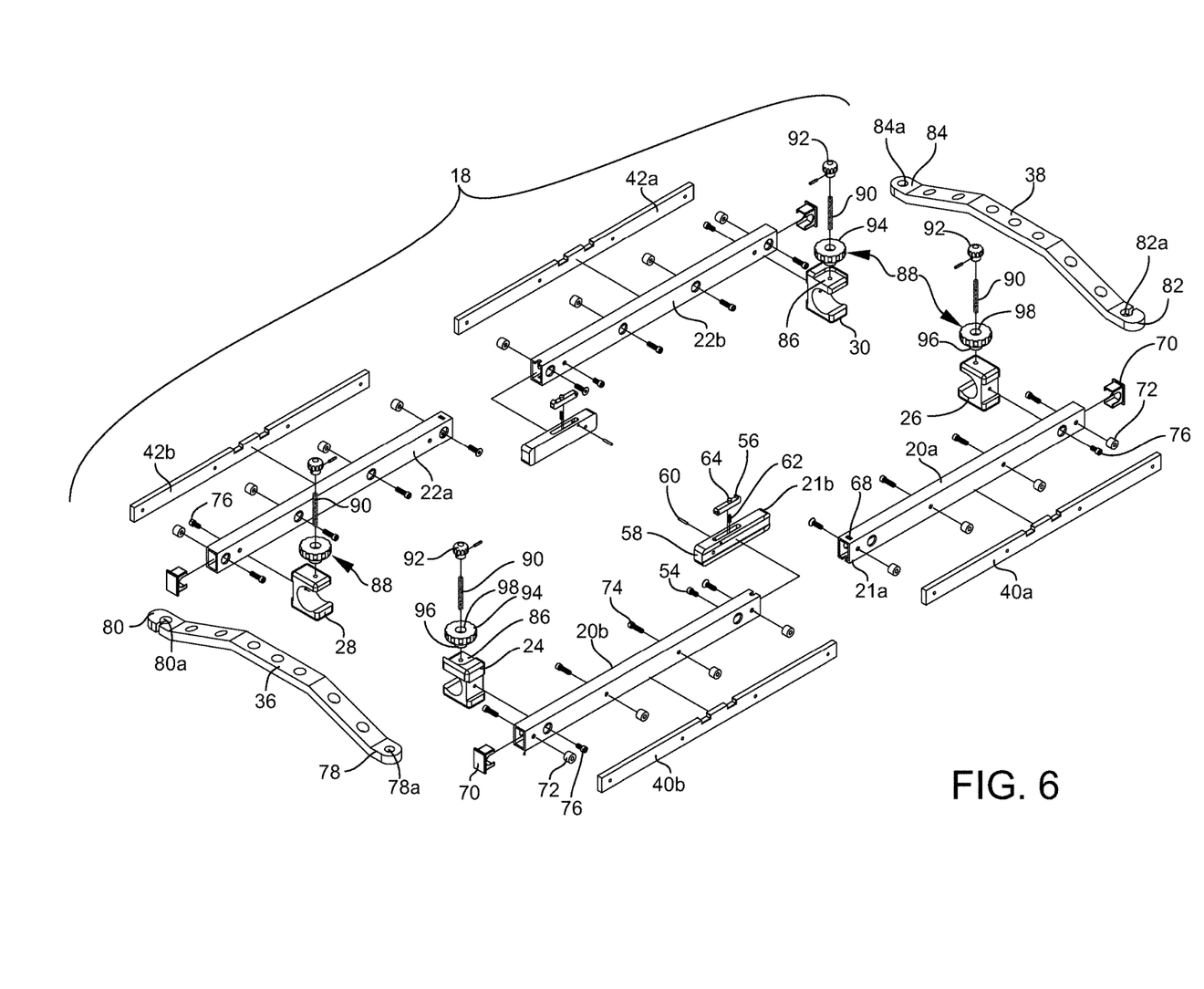
FIG. 6 is an exploded view of the surgical rail apparatus of FIG. 5.

Referring to FIGS. 4-6, surgical rail apparatus 18 includes a first longitudinal member 20 and a second longitudinal member 22 spaced apart from and parallel to the first longitudinal member 20. A first clamp 24 has a circular inner surface 32a and an opening 34a for receiving one of the pair of parallel poles 12. First clamp 24 is fixed to one end of the first longitudinal member 20 such that the opening 34a faces the second longitudinal member 22. A second clamp 26 has a circular inner surface 32b and an opening 34b for receiving one of the pair of parallel poles 12. Second clamp 26 is fixed to another end of the first longitudinal member 20 such that the opening 34b faces the second longitudinal member 22.

A third clamp 28 has a circular inner surface 32c and an opening 34c for receiving the other of the pair of parallel poles 12. Third clamp 28 is fixed to one end of the second longitudinal member 22 such that the opening 34c faces the first clamp 24 on the first longitudinal member 20. A fourth clamp 30 has a circular inner surface 32d and an opening 34d for receiving the other of the pair of parallel poles 12. The fourth clamp 30 is fixed to another end of the second longitudinal member 22 such that the opening 34d faces the second clamp 26 on the first longitudinal member 20.

A first cross bar 36 extends between and is fixed to the first and third clamps 24, 28. A second cross bar 38 extends between and is fixed to the second and fourth clamps 26, 30. A first rectangular bar 40 is spaced apart from and fixed to an outer surface 44 (FIG. 5) of the first longitudinal member 20. A second rectangular bar 42 is spaced apart from and fixed to an outer surface 46 of the second longitudinal member 22. In one preferred embodiment, the first and second rectangular bars 40, 42 are standard surgical rails. Standard surgical rails are known in the art and are able to receive and mount a wide variety of medical and surgical devices. Standard surgical rails have a rectangular cross-section. The North American standard surgical table side rail is 1.125 inches by 0.375 inches. The European standard surgical rail is 25 mm by 10 mm. As is known in the art, notches 48 may be formed in rails 40, 42 for ease of mounting and dismounting certain medical and surgical devices. The medical and surgical devices mounted on rails 40, 42 will be secure. The longitudinal members 20, 22 will not be subject to rotation about poles 12 or horizontal or vertical displacement.

The components of apparatus 18 may be made of, for example, aluminum. Aluminum is strong and light in weight. Minimizing weight is very important when apparatus 18 is used in far forward military areas where much gear must be carried by soldiers and motorized transport is not available or difficult to obtain. In one embodiment, the first and second longitudinal members 20, 22 are hollow members. Members 20, 22 may have various shaped cross-sections. In one preferred embodiment, the cross-sections of members 20, 22 are rectangular or square tubes. The weight of apparatus 18 may be further reduced by the use of lightening holes 50 in members 20, 22 and lightening holes 52 in cross members 36, 38. In one embodiment, first and second longitudinal members 20, 22 may have lengths in the range of about three feet to about four feet. Other lengths of first and second longitudinal members 20, 22 may be used depending on particular needs. Members 20, 22 should be at least as long as their corresponding rails 40, 42, for stability.

The detailed construction of one embodiment of apparatus 18 is best explained with reference to the exploded view shown in FIG. 6. The first longitudinal member 20 may comprise a sub-member 20a with a female end 21a and a sub-member 20b with a male end 21b. The male end 21b may be fixed to sub-member 20b using, for example, a fastener 54. Sub-member 20b with male end 21b fixed thereto is inserted in the female end 21a of sub-member 20a. Male end 21b includes a latch 56 rotatably fixed in a latch housing 58 using a pin 60. Latch 56 is spring-loaded in housing 58 with spring 62. Male end 21b is inserted in female end 21a by depressing latch 56 using knob 64 which allows latch 56 to enter female end 21a. Then, latch 56 snaps in a locked position in latch opening 68 in female end 21a. Plugs 70 may be inserted in the other ends of sub-members 20a and 20b.

First rectangular bar 40 may include a pair of sub-bars 40a, 40b fixed to respective sub-members 20a, 20b. As noted above, sub-bars 40a, 40b are preferably standard surgical rails. Sub-bars 40a, 40b are spaced apart from sub-members 20a, 20b using a plurality of spacers 72. The spacers 72 create a gap between sub-members 20a, 20b and sub-bars 40a, 40b so that medical/surgical devices may be attached and mounted on sub-bars 40a, 40b. Sub-bars 40a, 40b may be fixed to respective sub-members 20a, 20b using, for example, a plurality of threaded fasteners 74.

As can be seen in FIG. 6, second longitudinal member 22 may comprise sub-members 22a and 22b with sub-bars 42a and 42b attached thereto. The construction and latching mechanism of sub-members 22a and 22b and the manner of attaching sub-bars 42a and 42b is similar to that of sub-members 20a, 20b and sub-bars 40a, 40b and, therefore, will not be described in detail again.

Cross bar 36 has flattened portions at each end with one flattened portion being a pivot end 78 and the other flattened portion being a slot end 80. Cross bar 38 similarly has flattened portions at each end with one portion being a pivot end 84 and the other portion being a slot end 82. Clamps 24, 26, 28 and 30 may be fixed to their respective sub-members 20b, 20a, 22a, 22b using, for example, fasteners 76. The tops (as viewed in FIG. 6) of clamps 24 and 30 include recessed portions 86 for receiving the pivot ends 78, 84 of their respective cross bars 36, 38. Clamps 28, 26 may have generally planar top portions for receiving the slot ends 80, 82 of the cross bars 36, 38. Clamps 24, 26, 28 and 30 may be fixed to parallel poles 12 of litter 10 using, for example, set screws 90 having turning knobs 92. It should be noted that the set screws 90 primarily constrain vertical translation of poles 12 in clamps 24, 26, 28 and 30 and the cross bars 36, 38 primarily constrain rotation of the sub-members 20a, 20b, 20c and 20d about the parallel poles 12.

The ends of cross bars 36, 38 may be fixed to clamps 24, 26, 28 and 30 using, for example, lock nuts 88. Each lock nut 88 includes a knob 94, a protuberance 96 beneath the knob 94, and a threaded through hole 98. Protuberances 96 may have smaller diameters than knobs 94 to facilitate grasping knobs 94 with one's fingers. Protuberances 96 are seated in openings 78a, 80a, 82a, 84a, in the flattened end portions of cross bars 36, 38. Lock nuts 88 are tightened using knob 94 to thread lock nuts 88 on set screws 90.

Apparatus 18 may be disassembled and transported in four parts or pieces, which makes assembly of apparatus 18 to a litter 10 easy. After some practice, apparatus 18 may be assembled to a litter 10 in 30 seconds or less. Referring to the view of FIG. 6, the four disassembled pieces each include one sub-member 20a, 20b, 22a, or 22b along with the sub-rail and clamp corresponding to that sub-member. The male ends of the sub-members 20b and 22b are disengaged from the corresponding female end sub-members 20a and 22a, respectively. Because opening 80a in cross member 36 is slotted, cross member 36 may simply be loosened from clamp 28 and rotated about set screw 90 of clamp 24 so that cross member 36 is parallel to and still attached to clamp 24 and sub-member 20b. Similarly, cross member 38 may be removed from clamp 26 and rotated about set screw 90 of clamp 30 so that cross member 38 is parallel to and still attached to clamp 30 and sub-member 22b. Thus, the four pieces of apparatus 18 may be easily transported because of their relatively short length and light weight. The four pieces may be easily assembled to a litter 10 or other patient carrier.

In some instances, one may desire a surgical bar or rail 40 or 42 only on one side of litter 10. In that case, one may use one side of apparatus 18, that is, one longitudinal member 20 or 22 with its corresponding surgical rail 40 or 42 and the corresponding clamps. In addition, the cross bars 36, 38 are used and are fixed to the opposite pole 12 of the litter 10 using the clamps, set screws 90 and lock nuts 88, without a longitudinal member and surgical rail.

Surgical rail apparatus 18 enables the attachment of surgical devices such as retractors, light systems, monitors, suction devices, IV poles, and other surgical devices that may be needed for surgery to a litter or stretcher. Apparatus 18 enables any litter or stretcher to be easily converted into an operating table. In rural and austere settings where both military and aid relief providers may be practicing, apparatus 18 provides a means to increase the number of operating tables. Surgeons can easily attach the surgical rail apparatus 18 to any litter or stretcher and attach any surgical devices needed to the apparatus 18, thereby enabling the surgeons to operate immediately.

When assembled to a litter, surgical rail apparatus 18 provides a surgical platform in mobile environments and/or space limited areas, such as the back of a truck, a helicopter, an airplane, a boat, a train, etc. Apparatus 18 may be easily removed from a litter, packaged up, moved to a new location and used on another stretcher. This capability is important if the current surgical environment becomes unsafe or unusable due to power outages, enemy presence, lack of patients or resources, natural disaster, fire, etc.

In a non-military setting, there are incidents throughout the world that often overwhelm the host nation's abilities and resources. When international aid missions are deployed they are often limited in their ability to provide ICU (Intensive Care Unit) and surgical capabilities. This is due to the cumbersome amount of equipment and supplies needed to support an ICU or OR (Operating Room). The present invention is lightweight and easily portable and can transform any litter into an ICU bed or operating room table, thus allowing for improved care during international/national crisis. The surgical rails are also the same standard dimension and size used for OR tables around the western world and therefore can immediately accept thousands of already existing medical devices for use in OR and ICU settings. Healthcare providers that deploy around the world to austere, hostile, or mobile environments can now convert any litter into a functional ICU or OR capable bed and use the same equipment that they use in their primary practice.

Surgical rail apparatus 18 may also enable one to fix legs (not shown) to the longitudinal members 20, 22 of the apparatus 18 so that the litter may be elevated to a functional height for surgical procedures. Rail apparatus 18 provides stability to the litter, allowing the litter to be elevated above the ground level. The surgical rail apparatus 18 may also enable one to attach support rods (not shown) to the longitudinal members 20, 22 so that multiple litters may be stacked on top of each other. The stacked litters retain the ability to hold multiple medical devices on the surgical rails of the apparatuses 18, which is important when the surgical/medical devices must remain in place during transportation of the patients on the litters. In addition to enabling stacking, the surgical rail apparatus 18 provides multiple points for stabilizing and securing the litter and apparatus 18 combination to the floor, walls, ceilings, etc. of different transportation platforms.

Many changes in the details, materials, steps and arrangement of parts described herein may be made by those skilled in the art within the principle and scope of the invention, as expressed in the appended claims. For example, various types of fasteners may be used and the components of the apparatus may have shapes and relative sizes that differ from the embodiment shown in the drawings.

What is claimed is:

1. An apparatus for use with a litter having a pair of parallel poles, comprising:
   a first longitudinal hollow member;
   a second longitudinal hollow member spaced apart from and parallel to the first longitudinal hollow member wherein the first and second longitudinal hollow members each comprise a sub-member with a female end and a sub-member with a male end and the male end is inserted in the female end and further wherein the male end includes a spring-loaded latch and the female end includes an opening in which the spring-loaded latch is disposed to thereby lock the sub-members together;
   a first clamp having a circular inner surface and an opening for receiving one of the pair of parallel poles, the first clamp being fixed to one end of the first longitudinal member such that the opening faces the second longitudinal member;

a second clamp having a circular inner surface and an opening for receiving the one of the pair of parallel poles, the second clamp being fixed to another end of the first longitudinal member such that the opening faces the second longitudinal member;

a third clamp having a circular inner surface and an opening for receiving the other of the pair of parallel poles, the third clamp being fixed to one end of the second longitudinal member such that the opening faces the first clamp on the first longitudinal member;

a fourth clamp having a circular inner surface and an opening for receiving the other of the pair of parallel poles, the fourth clamp being fixed to another end of the second longitudinal member such that the opening faces the second clamp on the first longitudinal member;

a first cross bar extending between and fixed to the first and third clamps;

a second cross bar extending between and fixed to the second and fourth clamps;

a first rectangular bar spaced apart from and fixed to an outer surface of the first longitudinal member; and a second rectangular bar spaced apart from and fixed to an outer surface of the second longitudinal member wherein the first and second rectangular bars have cross-sections of one of a North American standard surgical rail and a European standard surgical rail; and further wherein:

each clamp includes a set screw for fixing the clamp to a respective one of the parallel poles and each clamp includes a lock nut having a protuberance disposed in an opening in one of the first and second cross bars for securing the one of the first and second cross bars to the clamp and the set screw engages a threaded opening in the lock nut.

2. An apparatus for use with a litter having a pair of parallel poles, comprising:

a first longitudinal hollow member;

a second longitudinal hollow member spaced apart from and parallel to the first longitudinal hollow member wherein the first and second longitudinal hollow members each comprise a sub-member with a female end and a sub-member with a male end and wherein the male end includes a spring-loaded latch and the female end includes an opening in which the spring-loaded latch is disposed to thereby lock the sub-members together;

a first clamp having a circular inner surface and an opening for receiving one of the pair of parallel poles, the first clamp being fixed to one end of the first longitudinal member such that the opening faces the second longitudinal member;

a second clamp having a circular inner surface and an opening for receiving the one of the pair of parallel poles, the second clamp being fixed to another end of the first longitudinal member such that the opening faces the second longitudinal member;

a third clamp having a circular inner surface and an opening for receiving the other of the pair of parallel poles, the third clamp being fixed to one end of the second longitudinal member such that the opening faces the first clamp on the first longitudinal member;

a fourth clamp having a circular inner surface and an opening for receiving the other of the pair of parallel poles, the fourth clamp being fixed to another end of the second longitudinal member such that the opening faces the second clamp on the first longitudinal member;

a first cross bar extending between and fixed to the first and third clamps;

a second cross bar extending between and fixed to the second and fourth clamps;

a first rectangular bar spaced apart from and fixed to an outer surface of the first longitudinal member;

a second rectangular bar spaced apart from and fixed to an outer surface of the second longitudinal member wherein the first and second rectangular bars have cross-sections of one of a North American standard surgical rail and a European standard surgical rail; and the litter wherein the first longitudinal member is disposed outboard of the one of the parallel poles, the second longitudinal member is disposed outboard of the other of the parallel poles, the first and second clamps are fixed to the one of the parallel poles, the second and third clamps are fixed to the other of the parallel poles and the first and second cross bars extend under a bed of the litter;

wherein each clamp includes a set screw for fixing the clamp to a respective one of the parallel poles and each clamp includes a lock nut having a protuberance disposed in an opening in one of the first and second cross bars for securing the one of the first and second cross bars to the clamp and wherein the set screw engages a threaded opening in the lock nut.

\* \* \* \* \*